US009988135B2

(12) United States Patent
Converse et al.

(10) Patent No.: US 9,988,135 B2
(45) Date of Patent: Jun. 5, 2018

(54) SYSTEM FOR CONTROLLING AN ELECTRICAL POWER SYSTEM (71) Applicant: Caterpillar Inc., Peoria, IL (US)

(72) Inventors: Perry D. Converse, Lafayette, IN (US); Theodore E. Wiersema, Peoria, IL (US)

(73) Assignee: Caterpillar Inc., Deerfield, IL (US)

(*) Notice: Subject to any disclaimer, the term of this patent is extended or adjusted under 35 U.S.C. 154(b) by 231 days.

(21) Appl. No.: 15/087,182

(22) Filed: Mar. 31, 2016

(65) Prior Publication Data
US 2017/0283024 A1    Oct. 5, 2017

(51) Int. Cl.
*B63H 21/21* (2006.01)
*B63J 3/02* (2006.01)
*H02J 5/00* (2016.01)

(52) U.S. Cl.
CPC ............... *B63H 21/21* (2013.01); *B63J 3/02* (2013.01); *H02J 5/00* (2013.01)

(58) Field of Classification Search
CPC ..................................................... B63H 21/21
See application file for complete search history.

(56) References Cited

U.S. PATENT DOCUMENTS

| | | | |
|---|---|---|---|
| 3,823,327 A | 7/1974 | Bayer | |
| 7,710,693 B2 | 5/2010 | Guzman-Castillas et al. | |
| 8,362,640 B2 * | 1/2013 | Craig | H02J 3/14 307/18 |
| 8,427,005 B1 * | 4/2013 | Kisner | H02J 3/16 307/18 |
| 8,432,065 B2 | 4/2013 | Reinkens | |
| 8,648,490 B2 * | 2/2014 | Craig | B63G 8/001 307/9.1 |
| 8,716,897 B2 | 5/2014 | Algrain | |
| 9,254,797 B2 * | 2/2016 | Craig | H02J 3/14 |
| 9,683,503 B2 * | 6/2017 | Zhang | F02D 41/0205 |
| 2010/0094490 A1 | 4/2010 | Alston et al. | |
| 2015/0097437 A1 | 4/2015 | Votoupal et al. | |
| 2015/0274275 A1 | 10/2015 | Dust et al. | |

* cited by examiner

*Primary Examiner* — Hai L Nguyen
(74) *Attorney, Agent, or Firm* — Leydig, Voit & Mayer, LTD.

(57) ABSTRACT

A system for limiting power to a plurality of on-line consumers includes an operating characteristic sensor associated with each of a plurality of prime movers and a controller. The controller is configured to determine a maximum torque capability of each of the plurality of prime movers, determine the available electrical power response of each of the plurality of generators, determine a total available electrical power response, and determine a total maximum power demand. The controller then compares the total available electrical power response to the total maximum power demand, and upon the total maximum power demand exceeding the total available electrical power response, limits power to the plurality of on-line consumers to no more than the total available electrical power response.

20 Claims, 3 Drawing Sheets

SYSTEM FOR CONTROLLING AN ELECTRICAL POWER SYSTEM

TECHNICAL FIELD

This disclosure relates generally to controlling electrical power within a system and, more particularly, to a system for dynamically controlling the amount of electrical power drawn by loads of the system.

BACKGROUND

Marine vessels and other isolated power systems often include a plurality of generator sets for providing power within the system. The generator sets often include a prime mover such as an engine that is coupled to and drives an electrical generator. The generators provide power to a bus and a plurality of loads or consumers may be connected to the bus. The consumers may include any type of mechanism or system that consumes power such as propellers, thrusters, HVAC systems, lighting systems, and pumps.

As a consumer is engaged or brought on-line, additional power will be drawn from the bus to operate the consumer. In some instances, the engines may be able to instantaneously provide additional torque to maintain the desired voltage and frequency output from the generators. However, in some instances, the load from the newly added consumer may exceed the ability of the generator sets to maintain the desired voltage and frequency. A resulting decrease in voltage, for example, may cause an increase in current, which may result in tripping a circuit breaker between the generator and the bus.

Tripping the circuit breaker will take the generator off-line and thus require additional power from the remaining on-line generators sets. In some instances, the remaining on-line generator sets may not be able to react quickly enough to the increased load, and circuit breakers associated with the remaining on-line generator sets may also trip. Depending upon the configuration of the power system, this may result in a total power outage or "blackout" at the isolated power system.

U.S. Patent Publication No. 2015/0274275 discloses a power system for a marine vessel with a plurality of generator sets. A control system associated with the power system may be configured to operate in different manners depending upon the operation being performed by the marine vessel. A load manager is operative to attempt to match the output of the generator sets with the desired power required for the various loads of the marine vessel.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a power system includes a plurality of prime movers, a plurality of generators providing power to a bus, with each generator being driven by one of the plurality of prime movers, an operating characteristic sensor associated with each of the plurality of prime movers for determining an operating characteristic of each prime mover, and a plurality of on-line consumers operatively connected to the bus. A controller is configured to store operating characteristics of each of the plurality of generators, store a plurality of maximum torque capabilities for each of the plurality of prime movers, with each of the plurality of maximum torque capabilities being based upon at least one operating characteristic of the prime mover, store a plurality of available electrical power responses for each of the plurality of generators, with each of the plurality of available electrical power responses being based upon one of the plurality of maximum torque capabilities of the prime mover driving the generator and the operating characteristics of the generator, and store a maximum power demand of each of the plurality of on-line consumers. The controller is further configured to determine a maximum torque capability of each of the plurality of prime movers, with the maximum torque capability being based upon data from the operating characteristic sensor associated with the prime mover, determine the available electrical power response of each of the plurality of generators, with the available electrical power response being based upon the operating characteristics of the generator and the maximum torque capability of the prime mover driving the generator, and determine a total available electrical power response, with the total available electrical power response being based upon the available electrical power response of the plurality of generators. The controller is still further configured to determine a total maximum power demand, with the total maximum power demand being based upon the maximum power demand of each of the plurality of on-line consumers, compare the total available electrical power response to the total maximum power demand, and upon the total maximum power demand exceeding the total available electrical power response, limit power to the plurality of on-line consumers to no more than the total available electrical power response.

In another aspect, a method of limiting power to a plurality of on-line consumers includes storing operating characteristics of each of a plurality of generators, storing a plurality of maximum torque capabilities for each of a plurality of prime movers, with each of the plurality of maximum torque capabilities being based upon at least one operating characteristic of the prime mover, storing a plurality of available electrical power responses for each of the plurality of generators, with each of the available electrical power responses being based upon the one of the plurality of maximum torque capabilities of a prime mover driving the generator and the operating characteristics of the generator, and storing a maximum power demand of each of a plurality of on-line consumers. The method further includes determining a maximum torque capability of each of the plurality of prime movers, with the maximum torque capability being based upon data from an operating characteristic sensor associated with the plurality of prime movers, determining an available electrical power response of each of the plurality of generators, with the available electrical power response being based upon the operating characteristics of the generator and the maximum torque capability of the prime mover driving the generator, and determining a total available electrical power response, with the total available electrical power response being based upon the available electrical power response of the plurality of generators. The method still further includes determining a total maximum power demand, with the total maximum power demand being based upon the maximum power demand of each of the plurality of on-line consumers, comparing the total available electrical power response to the total maximum power demand, and upon the total maximum power demand exceeding the total available electrical power response, limiting power to the plurality of on-line consumers to no more than the total available electrical power response.

In still another aspect, a system for limiting power to a plurality of on-line consumers includes an operating characteristic sensor associated with each of a plurality of prime movers for determining an operating characteristic of each prime mover and a controller. The controller is configured to store operating characteristics of each of a plurality of generators, store a plurality of maximum torque capabilities for each of the plurality of prime movers, with each of the plurality of maximum torque capabilities being based upon at least one operating characteristic of the prime mover, store a plurality of available electrical power responses for each of the plurality of generators, with each of the plurality of available electrical power responses being based upon one of the plurality of maximum torque capabilities of a prime mover driving the generator and the operating characteristics of the generator, and store a maximum power demand of each of a plurality of on-line consumers. The controller is further configured to determine a maximum torque capability of each of the plurality of prime movers, with the maximum torque capability being based upon data from the operating characteristic sensor associated with the prime mover, determine the available electrical power response of each of the plurality of generators, with the available electrical power response being based upon the operating characteristics of the generator and the maximum torque capability of the prime mover driving the generator, and determine a total available electrical power response, the total available electrical power response being based upon the available electrical power response of the plurality of generators. The controller is still further configured to determine a total maximum power demand, with the total maximum power demand being based upon the maximum power demand of each of the plurality of on-line consumers, compare the total available electrical power response to the total maximum power demand, and upon the total maximum power demand exceeding the total available electrical power response, limit power to the plurality of on-line consumers to no more than the total available electrical power response.

DETAILED DESCRIPTION

Figure 1:
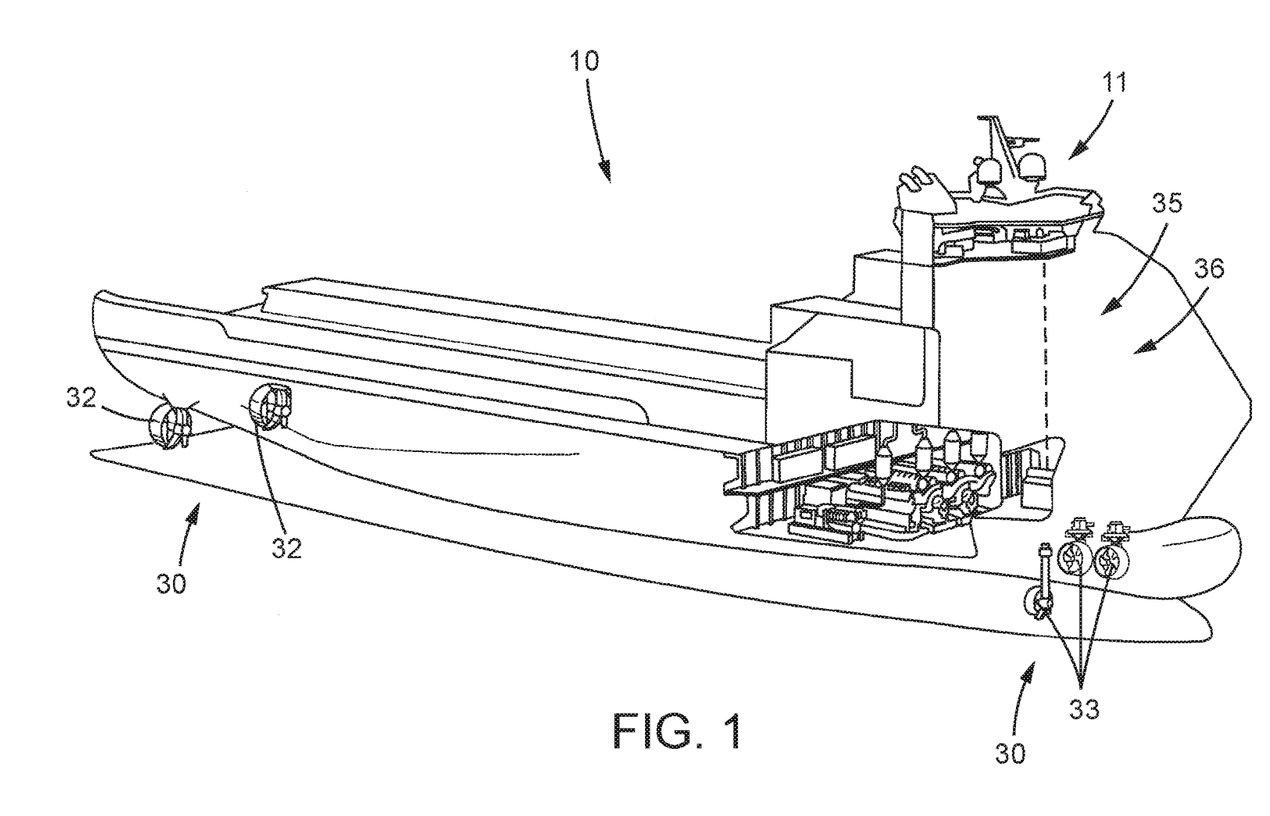
FIG. 1 depicts a diagrammatic illustration of a machine in accordance with the disclosure.

FIG. 1 illustrates a marine vessel 10 having a power system indicated generally at 20 configured to supply power to a plurality of systems or devices that operate as loads or consumers 30. Power system 20 may be controlled from a bridge 11 (or another location on-board and/or off-board vessel 10). Loads or consumers 30 may include any device or system that consumes electrical or mechanical power including motors (not shown) that drive propellers 32 of vessel 10, thrusters 33, HVAC systems, water pumps, lights, and other auxiliary systems that may be found on a marine vessel. Consumers 30 may be controlled or actuated through input devices (not shown) located at the bridge 11 or other locations on-board or off-board the vessel 10. Although depicted for use with a marine vessel 10, the power system 20 may be used in any environment including, in particular, those that are isolated from other power systems.

Power system 20 (FIG. 2) may include one or more generator sets indicated generally at 21 operable to generate electricity, and a power-transmission network such as a bus 31 for transferring electricity from the generator sets 21 to the consumers 30. In one embodiment, each generator set 21 may include a prime mover or engine 22 mechanically coupled or otherwise operatively connected to an electrical generator 23. Although depicted as a diesel engine, each prime mover may embody any desired form. A fuel system indicated generally at 24 is operatively connected to the engines 22 to provide fuel as necessary to provide the desired output from the engines.

Figure 2:
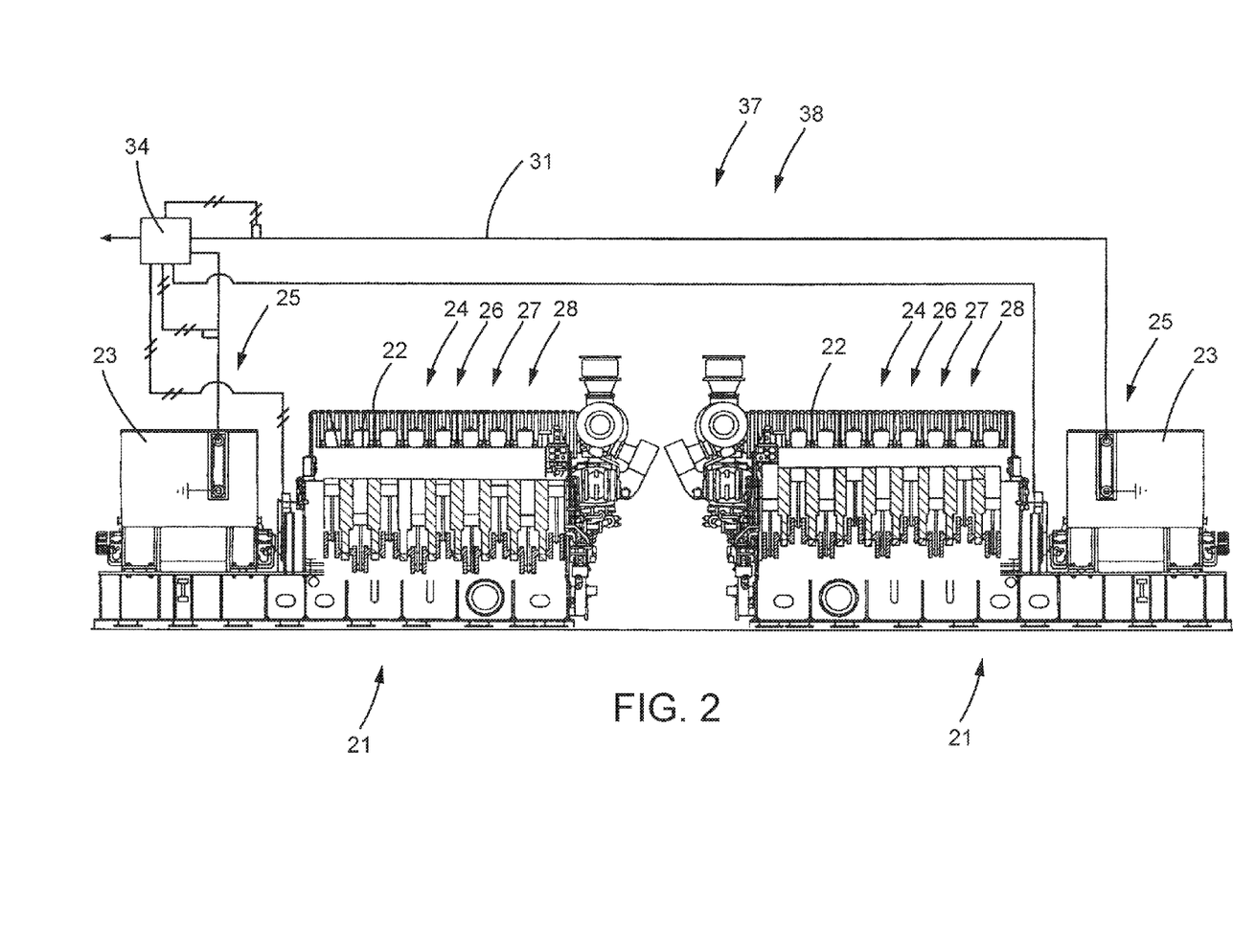
FIG. 2 depicts a diagrammatic illustration of a portion of a power system for use with the machine of FIG. 1.

Each generator 23 may be any type of electrical power producing device mechanically coupled to receive rotational power from an engine 22 and convert the mechanical power into electricity. Generator 23 may embody any type of electric machine including an AC induction generator, a permanent-magnet generator, an AC synchronous generator, or a switched-reluctance generator. In some embodiments, generator 23 may generate three-phase electrical power with an alternating current and a relatively fixed frequency and voltage. In other embodiments, the generator 23 may generate three-phase electrical power with an alternating current and a variable frequency and voltage.

Each generator 23 may be operatively connected to electrical and electronic conditioning circuitry and systems indicated generally at 25 to modify and control the electrical output from the generators as desired. Such circuitry may include rectifier systems for converting AC power into DC power. Inverter systems may be used to convert the DC power into AC power at a specified frequency and voltage. In addition, each generator 23 may be operatively connected to a synchronization system to control the input of electrical power onto the bus 31. The synchronization system may operate so that each generator 23 provides power to the bus 31 in phase and at the same frequency and voltage. The generator sets 21 may be operated in any desired combination to provide power to the bus 31. In some instances, as discussed below, load management system 38 may utilize the conditioning circuitry and systems to limit the power provided to consumers 30 on the bus 31.

Vessel 10 may be controlled by a control system 35 as shown generally by an arrow in FIG. 1 indicating association with the vessel. The control system 35 may include an electronic control module or controller indicated generally at 36 and a plurality of sensors. The controller 36 may receive input signals from an operator at the bridge 11 or elsewhere on-board or off-board the vessel 10. The controller 36 may control the operation of various aspects of the vessel 10 including propulsion, electrical, and hydraulic systems.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 36 such as power supply circuitry, signal conditioning circuitry, driver circuitry, and other types of circuitry.

The controller 36 may be a single controller or may include more than one controller disposed to control various functions and/or features of the vessel 10. The term "controller" is meant to be used in its broadest sense to include one or more controllers and/or microprocessors that may be associated with the vessel 10 and that may cooperate in controlling various functions and operations of the vessel. The functionality of the controller 36 may be implemented in hardware and/or software without regard to the functionality. The controller 36 may rely on one or more data maps, relating to the operating conditions and the operating environment of the vessel 10 and its systems, which may be stored in the memory of controller. Each of these data maps may include a collection of data in the form of tables, graphs, and/or equations.

Vessel 10 may be equipped with a plurality of sensors that provide data indicative (directly or indirectly) of various operating parameters of the vessel and/or the operating environment in which the vessel is operating. The term "sensor" is meant to be used in its broadest sense to include one or more sensors and related components that may be associated with the vessel 10 and that may cooperate to sense various functions, operations, and operating characteristics of the vessel and/or aspects of the environment in which the vessel is operating.

The control system 35 may include a power generation management system 37, indicated generally by an arrow in FIG. 2, configured to monitor and control the operation of the generator sets 21 and determine the amount of power in the form of electricity being generated. The power generation management system 37 may include a plurality of sensors associated with each engine 22 to measure various conditions and operating characteristics associated with the operation of the engine. These operating characteristic sensors may include an engine temperature sensor 26, an engine speed sensor 27, and a fuel flow rate sensor 28, each of which is shown generally by an arrow in FIG. 2. The power generation management system 37 may operate to maintain the speed of the engine 22 at a desired rate. The power generation management system 37 may maintain the engine 22 at a desired speed such as by controlling the amount of fuel supplied to the engine in view of the operating conditions of the engine and anticipated load requirements.

The power generation management system 37 may also determine the instantaneous torque capability or limit of the on-line engines 22 based upon the operating conditions of the engines. In other words, the power generation management system 37 may determine the amount of torque being provided by the on-line engines 22 together with the amount of instantaneous additional torque that may be provided by the engines without materially reducing their rotational speed. A material reduction in rotational speed of an engine 22 may result in a reduction in voltage or frequency of the generator 23 being driven by the engine that exceeds a predetermined voltage or frequency drop threshold. One or more thresholds may be stored within controller 36.

The power generation management system 37 may utilize various operating characteristics of the engine 22 such as the operating speed, the engine temperature, fuel intake conditions (including fuel flow rate), and exhaust conditions together with data maps from the controller 36 to determine the maximum torque capability that may be provided by the engine 22 (i.e., the instantaneous torque limit) based upon the current operating conditions. In some instances, the power generation management system 37 may utilize engine speed and fuel consumption rate to make an accurate determination of the torque of the engine 22. The current torque together with the characteristics of the engine 22 may be used to determine the maximum torque capability as desired. In one embodiment, the combination of the engine speed sensor 27 and the fuel flow rate sensor 28 may act as an equivalent of a torque sensor for generating torque signals indicative of an output torque from the engine 22. Other manners of determining the output torque from the engine 22 are contemplated.

Based upon the maximum torque capability or instantaneous torque limit of each engine 22, the power generation management system 37 may determine the available electrical power response of the generator 23 (e.g., kW/second) that is operatively connected to the engine. The available power response for any generator 23 is generally a function of the torque of the prime mover or engine 22 driving the generator. The available power response is the amount of electrical power that may be removed or pulled from the bus 31 by loads or consumers 30 on the bus without a material reduction in the rotational speed of the engine 22 driving that generator. In one embodiment, a reduction in speed of an engine 22 that exceeds a predetermined threshold is one that results in a reduction in the rotational speed of the generator 23 associated with the engine causing a voltage drop in the output of the generator that exceeds a threshold voltage drop. In other words, a threshold rotational speed reduction of the engine 22 may be linked to a maximum desired voltage drop at the output of the generator 23.

To determine the available power response of the generator 23, the power generation management system 37 may utilize data maps within the controller 36 in view of the operating conditions of the engine 22 and the generator 23 as well as the characteristics of the engine and the generator. Other factors, such as characteristics of the bus 31 and power conversion efficiencies, may also contribute to the available power response and may be accounted for in the data maps within the controller 36.

The power system 20 may include more than one generator set 21 and, at times, one or more of the generator sets 21 may not be operating. References herein to operating characteristics and performance exclude such non-operating engines 22 and generators 23. For example, a reference to the maximum torque capabilities of engines 22 refers to the engines that are operating on-line and connected to an operating generator 23. Similarly, a plurality of consumers 30 may be connected to bus 31. However, such consumers 30 may only operate as loads on the bus 31 when they are operating or are operatively connected such as when a vessel operator or a system has provided instructions to operate such consumers.

The control system 35 may include a load management system 38, indicated generally by an arrow in FIG. 2, configured to monitor the loads of the consumers 30 operatively connected to the bus 31. The load management system 38 may also control current to the consumers 30, and in some instances, prioritize the current flow to the consumers. The load management system 38 may include a load sensor 34 associated with one or more consumers 30 to measure the electrical load on the bus 31 as a result of the consumers.

The controller 36 may include or have stored therein data maps indicative of the maximum electrical load required or that may be pulled for each consumer 30. It should be noted that some consumers 30 may require a full electrical load to operate while others may be variable load consumers that may be operated at less than their full load. For example, an HVAC system may require a full electrical load or power while thrusters may be operated with less than full power. In such case, the HVAC system may be inoperative unless running at full power while the thrusters may merely operate at a lower rotational rate in case of reduced power. The operability of a consumer 30 at less than a full load may also be stored within the data maps.

Absent operating constraints or constraining systems, engagement of an input device (not shown) to actuate a consumer 30 will typically increase the electrical load on the bus 31. If the on-line engines 22 are operating at or near their maximum torque capability, adding such a consumer 30 may draw too much instantaneous power. Attempting to draw more power than is available may cause a voltage drop and a resulting increase in current, which may cause a circuit breaker to trip.

In order to prevent overloading the generators 23 and unwanted tripping of a circuit breaker, the load management system 38 may be configured to determine the maximum possible load on the bus 31 as a result of all of the operating consumers 30, and control the operation of the consumers based upon that maximum possible load and the available power response of the on-line generators 23. Based upon the available power response, the load management system 38 may limit the instantaneous power drawn by all of the operating consumers 30, which may result in some of the consumers receiving insufficient current to operate at the desired level or operate at all. By controlling the current or power being drawn by the consumers 30, the likelihood is reduced that the maximum available power response from the generator sets 21 will be exceeded. In one embodiment, the load management system 38 may utilize the conditioning circuitry and systems 25 to limit the amount of current that may be drawn by the consumers 30.

By limiting the amount of current available to be drawn, the load management system 38 may permit the power generation management system 37 to increase the maximum available power response and ultimately reach the desired maximum available power response and thus permit the operation, albeit sometimes in a delayed manner, of all of the desired consumers 30 without tripping any circuit breakers.

Figure 3:
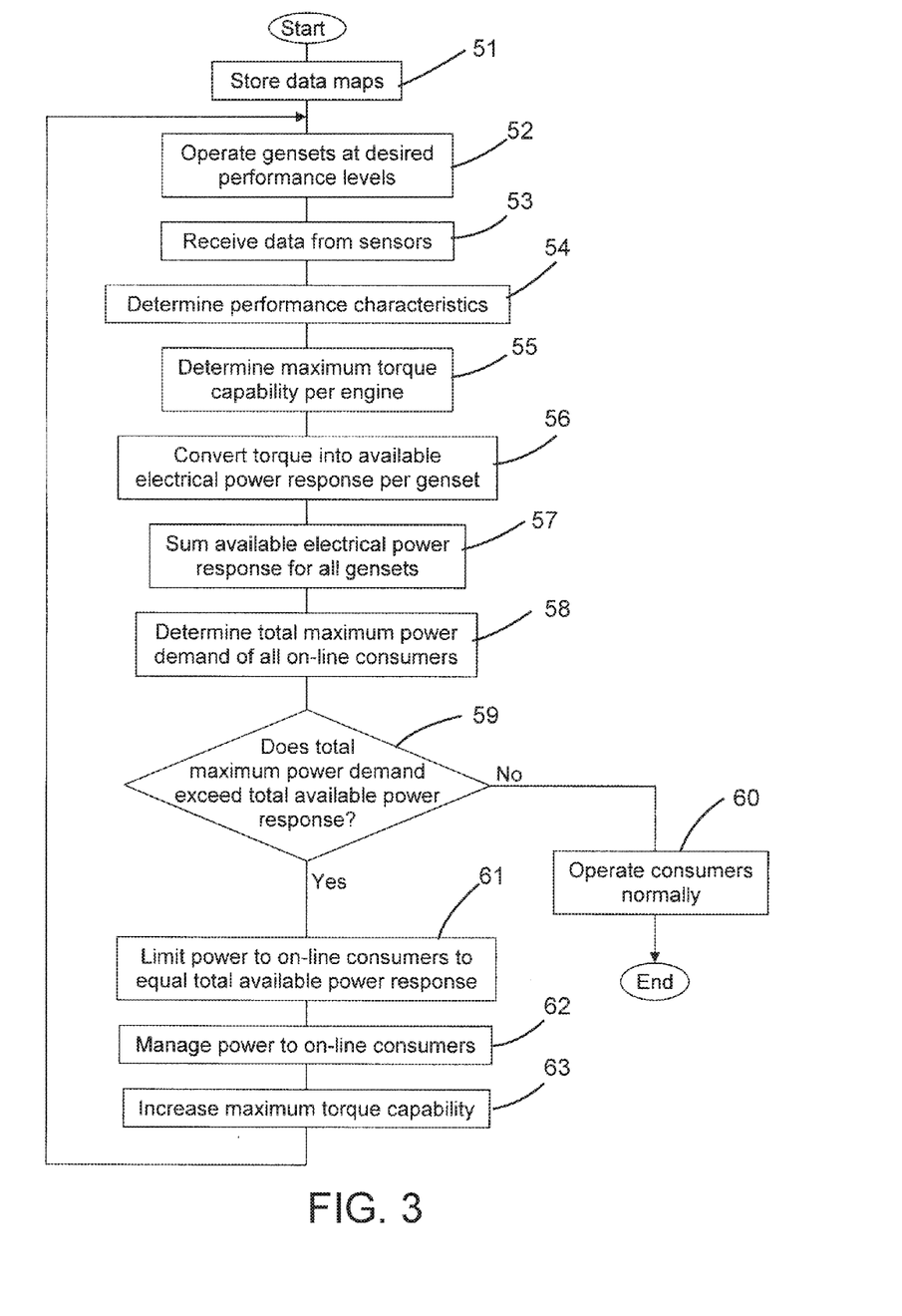
FIG. 3 depicts a flowchart illustrating a process for controlling power to a plurality of electrical power consumers.

The flowchart in FIG. 3 depicts the operation of the power system 20 with a plurality of consumers 30 operatively connected to the power system. At stage 51, data maps of the characteristics and performance of the power system 20 including the engines 22 and the generators 23 may be stored within controller 36. These data maps may include maximum torque capabilities or limits of the engines 22 based upon the operating conditions of the engines as well as the available power response of the generators 23. In addition, the data maps may also include the characteristics and performance as well as the maximum power demand of each consumer 30 that may be operatively connected to the bus 31. In addition, the data maps may also store whether each consumer may be operated at less than full load and the relative priority of the operation of the consumers.

The vessel 10 may be operated at stage 52 with the engines 22 and the generators 23 operating at desired performance levels. For example, the generator sets 21 are configured to operate at a constant speed and voltage, the engines 22 and generators 23 may be operated at such constant speed and voltage. At stage 53, data from the sensors on the vessel 10 may be received by controller 36. In particular, data may be received by controller 36 from the engine speed sensor 27, the fuel flow rate sensor 28, as well as load sensors 34 associated with the consumers 30. The controller 36 may determine certain performance characteristics at stage 54 such as the speed of each engine 22 based upon the data from the engine speed sensor 27 associated with each engine and further may determine the fuel consumption or flow rate for each engine based upon the data from the fuel flow rate sensor 28 associated with each engine.

The power generation management system 37 of the control system 35 may determine at stage 55 the maximum torque capability of each on-line engine 22 based upon its engine speed and fuel consumption through the use of the data maps stored within the controller 36. Based upon the maximum torque capability of each on-line engine 22 and the characteristics of each generator 23 connected to the on-line engines, the power generation management system 37 may determine at stage 56 the available electrical power response associated with each generator set 21. At stage 57, the power generation management system 37 may add or sum the available electrical power responses from all of the on-line generator sets 21 to determine the total available electrical power response within the power system 20.

At stage 58, the load management system 38 may determine the total maximum power demand of all of the consumers 30 that are operating on the bus 31. To do so, the load management system 38 may determine which consumers 30 are on-line and utilize the maximum possible load or power demand of the on-line consumers 30 stored within controller 36 and add or sum the maximum power demands to determine or generate a total maximum power demand. At decision stage 59, the load management system 38 may compare the total maximum power demand of the on-line consumers 30 with the total available power response of the on-line generator sets 21. If the total maximum power demand of the on-line consumers 30 is less than or equal to the total available power response from the on-line generator sets 21, all of the on-line consumers may be operated normally at stage 60.

If the total maximum power demand of the on-line consumers 30 is greater than the total available electrical power response from the on-line generator sets 21, the load management system 38 may limit the power to the on-line consumers at stage 61 to equal the total available electrical power response from the on-line generator sets. By doing so, the maximum torque capability of each engine 22 will not be exceeded, thus reducing the likelihood that a circuit breaker will be tripped.

In some instances, the load management system 38 may also be configured to manage power delivered to the consumers 30. For example, the delivery of power to certain consumers 30 may be prioritized over the delivery of power to other consumers. Such prioritization may be stored within controller 36 at stage 51. In instances in which the load management system 38 is configured to manage how the power is delivered to the consumers 30, if the total maximum power demand exceeds the total available electrical power response at decision stage 59, the load management system may reduce or terminate power delivery to some consumers while maintaining full power delivery to other consumers. In one embodiment, the load management system 38 may provide full power to each consumer 30 based upon the relative priority of the consumers until all of the total available electrical power response has been distributed to the consumers. In another embodiment, the load management system 38 may provide full power to some of the consumers 30 and less than full power to others of the consumers.

If the load management system 38 is not configured to manage how the power is delivered to the consumers 30, the load management system 38 may reduce the power delivery to each of the on-line consumers uniformly. For example, the load management system 38 may determine the percentage by which the total maximum power demand exceeds the total available electrical power response and uniformly reduce the power delivered to each of the consumers by such percentage. In instances in which some of the consumers 30 are not configured to operate at less than their full power, the reduction in power delivered to the consumers may result in those consumers shutting down until additional power is available.

At stage 63, power generation management system 37 may increase the fuel delivery rate to one or more of the engines 22 or bring additional engines and generators 23 (i.e., generator sets 21) on-line to increase the maximum torque capability of the engines and thus increase the total available electrical power response on the bus 31. Increasing the total available electrical power response will result in an increase in the amount of electrical power available to consumers 30 operating on the bus. The process of stages 52-63 may be repeated until a sufficient amount of power is available to operate all on-line consumers 30 normally at stage 60.

INDUSTRIAL APPLICABILITY

The industrial applicability of the system described herein will be readily appreciated from the forgoing discussion. The foregoing discussion is applicable to power systems 20 used with marine vessels and other isolated power systems. Such power systems 20 may include a plurality of generator sets 21, with each generator set including a prime mover that drives a generator 23.

A control system 35 may include a power generation management system 37 to monitor and control the operation of the generator sets 21 and determine the amount of electricity being generated. In addition, a load management system 38 may be provided that monitors the loads of the consumers 30 operatively connected to the bus 31 and controls the current or power to the consumers 30. If the maximum load that the on-line consumers 30 may draw exceeds the total available electrical power response from all of the on-line generators 23, the load management system 38 may limit the power to the consumers to reduce the risk that circuit breakers on the power system 20 will be tripped.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A power system comprising:
   a plurality of prime movers;
   a plurality of generators providing power to a bus, each generator being driven by one of the plurality of prime movers;
   an operating characteristic sensor associated with each of the plurality of prime movers for determining an operating characteristic of each prime mover;
   a plurality of on-line consumers operatively connected to the bus; and
   a controller configured to:
      store operating characteristics of each of the plurality of generators;
      store a plurality of maximum torque capabilities for each of the plurality of prime movers, each of the plurality of maximum torque capabilities being based upon at least one operating characteristic of the prime mover;
      store a plurality of available electrical power responses for each of the plurality of generators, each of the plurality of available electrical power responses being based upon one of the plurality of maximum torque capabilities of the prime mover driving the generator and the operating characteristics of the generator;
      store a maximum power demand of each of the plurality of on-line consumers;
      determine a maximum torque capability of each of the plurality of prime movers, the maximum torque capability being based upon data from the operating characteristic sensor associated with the prime mover;
      determine an available electrical power response of each of the plurality of generators, the available electrical power response being based upon the operating characteristics of the generator and the maximum torque capability of the prime mover driving the generator;
      determine a total available electrical power response, the total available electrical power response being based upon the available electrical power response of the plurality of generators;
      determine a total maximum power demand, the total maximum power demand being based upon the maximum power demand of each of the plurality of on-line consumers;
      compare the total available electrical power response to the total maximum power demand; and
      upon the total maximum power demand exceeding the total available electrical power response, limit power to the plurality of on-line consumers to no more than the total available electrical power response.

2. The power system of claim 1, further including a fuel flow rate sensor operatively associated with each of the plurality of prime movers for determining a fuel flow rate to each prime mover and the at least one operating characteristic of the prime mover includes the fuel flow rate to each prime mover.

3. The power system of claim 2, further including an engine speed sensor operatively associated with each prime mover for determining an operating speed of each prime mover and the at least one operating characteristic of the prime mover includes an operating speed of each prime mover.

4. The power system of claim 1, wherein the controller is further configured to prioritize power to at least some of the plurality of on-line consumers.

5. The power system of claim 1, wherein the controller is further configured to reduce power uniformly to at least some of the plurality of on-line consumers.

6. The power system of claim 1, wherein the controller is further configured to increase the maximum torque capability when the total maximum power demand exceeds the total available electrical power response.

7. The power system of claim 6, wherein the controller is further configured to increase a fuel flow rate to at least one prime mover to increase the maximum torque capability and determine a subsequent total available electrical power response based upon a subsequent increased maximum torque capability.

8. The power system of claim 6, wherein the controller is further configured to bring on-line an additional prime mover and generator to increase the maximum torque capability.

9. The power system of claim 1, wherein at least one of the plurality of on-line consumers is a variable load consumer operative at less than its maximum power demand.

10. The power system of claim 9, wherein the controller is further configured to limit power to at least one variable load consumer to less than its maximum power demand.

11. The power system of claim 1, wherein the plurality of prime movers includes a plurality of engines.

12. The power system of claim 1, wherein the plurality of prime movers and the plurality of generators are on-board a marine vessel.

13. A method of limiting power to a plurality of on-line consumers, comprising:
storing operating characteristics of each of a plurality of generators;
storing a plurality of maximum torque capabilities for each of a plurality of prime movers, each of the plurality of maximum torque capabilities being based upon at least one operating characteristic of the prime mover;
storing a plurality of available electrical power responses for each of the plurality of generators, each of the plurality of available electrical power responses being based upon the one of the plurality of maximum torque capabilities of a prime mover driving the generator and the operating characteristics of the generator;
storing a maximum power demand of each of a plurality of on-line consumers;
determining a maximum torque capability of each of the plurality of prime movers, the maximum torque capability being based upon data from an operating characteristic sensor associated with the plurality of prime movers;
determining an available electrical power response of each of the plurality of generators, the available electrical power response being based upon the operating characteristics of the generator and the maximum torque capability of the prime mover driving the generator;
determining a total available electrical power response, the total available electrical power response being based upon the available electrical power response of the plurality of generators;
determining a total maximum power demand, the total maximum power demand being based upon the maximum power demand of each of the plurality of on-line consumers;
comparing the total available electrical power response to the total maximum power demand; and
upon the total maximum power demand exceeding the total available electrical power response, limiting power to the plurality of on-line consumers to no more than the total available electrical power response.

14. The method of claim 13, further including determining a fuel flow rate to each prime mover and determining the maximum torque capability of each prime mover based upon its fuel flow rate.

15. The method of claim 14, further including determining an operating speed of each prime mover and determining the maximum torque capability of each prime mover based upon its operating speed.

16. The method of claim 13, further including prioritizing power to at least some of the plurality of on-line consumers.

17. The method of claim 13, further including reducing power uniformly to at least some of the plurality of on-line consumers.

18. The method of claim 13, further including increasing the maximum torque capability when the total maximum power demand exceeds the total available electrical power response.

19. The method of claim 13, wherein at least one of the plurality of on-line consumers is a variable load consumer operative at less than its maximum power demand, and further including limiting power to at least one variable load consumer to less than its maximum power demand.

20. A system for limiting power to a plurality of on-line consumers, comprising:
an operating characteristic sensor associated with each of a plurality of prime movers for determining an operating characteristic of each prime mover; and
a controller configured to:
store operating characteristics of each of a plurality of generators;
store a plurality of maximum torque capabilities for each of the plurality of prime movers, each of the plurality of maximum torque capabilities being based upon at least one operating characteristic of the prime mover;
store a plurality of available electrical power responses for each of the plurality of generators, each of the plurality of available electrical power responses being based upon one of the plurality of maximum torque capabilities of a prime mover driving the generator and the operating characteristics of the generator;
store a maximum power demand of each of a plurality of on-line consumers;
determine a maximum torque capability of each of the plurality of prime movers, the maximum torque capability being based upon data from the operating characteristic sensor associated with the prime mover;
determine the available electrical power response of each of the plurality of generators, the available electrical power response being based upon the operating characteristics of the generator and the maximum torque capability of the prime mover driving the generator;
determine a total available electrical power response, the total available electrical power response being based upon the available electrical power response of the plurality of generators;

determine a total maximum power demand, the total maximum power demand being based upon the maximum power demand of each of the plurality of on-line consumers;

compare the total available electrical power response to the total maximum power demand; and upon the total maximum power demand exceeding the total available electrical power response, limit power to the plurality of on-line consumers to no more than the total available electrical power response.

* * * * *